April 17, 1934. F. C. VONDERAHE 1,954,854
GARDEN TOOL
Filed May 2, 1932
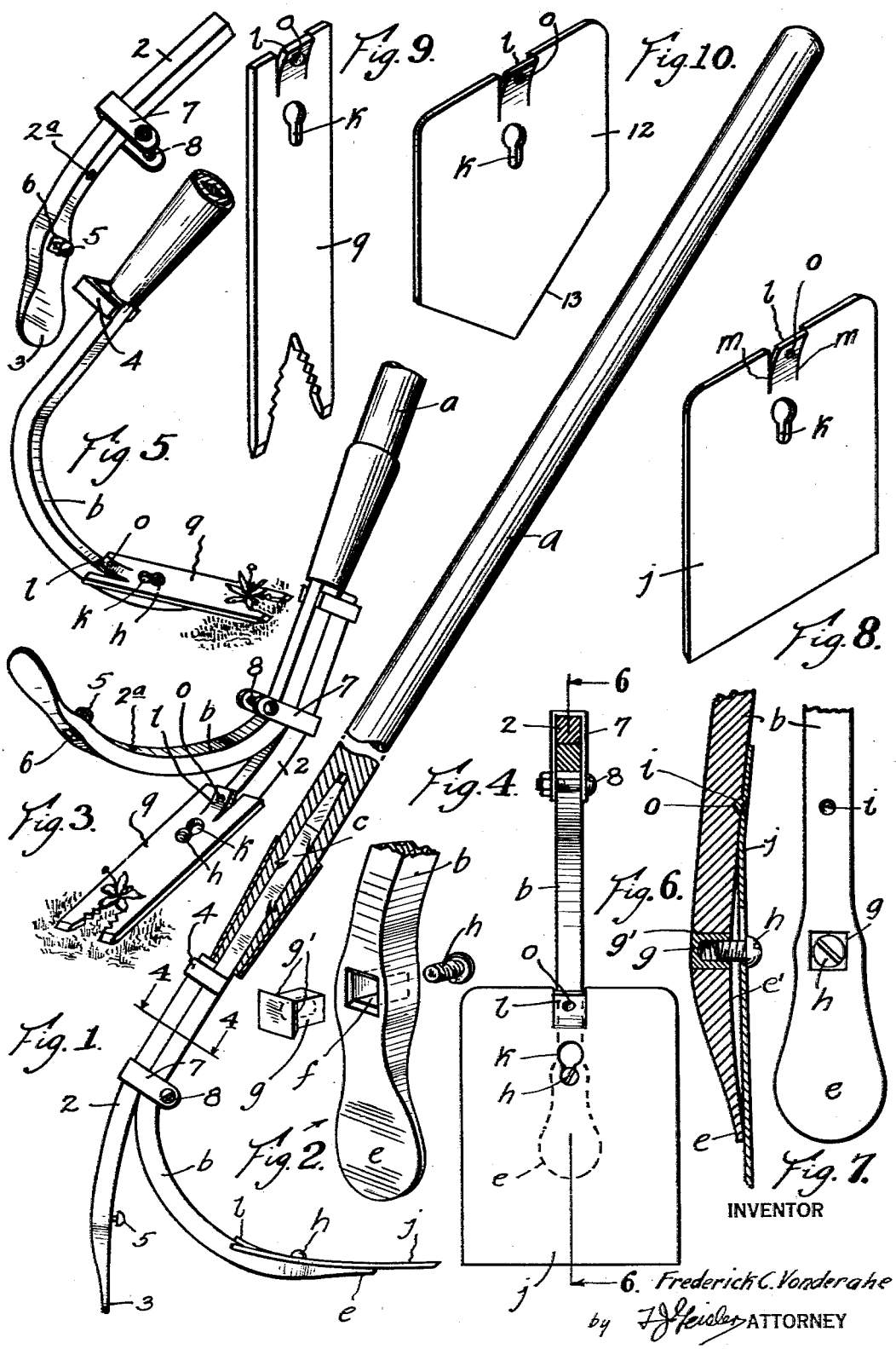
INVENTOR
Frederick C. Vonderahe
by [signature] ATTORNEY Patented Apr. 17, 1934

1,954,854

UNITED STATES PATENT OFFICE 1,954,854

GARDEN TOOL

Frederick C. Vonderahe, Milwaukie, Oreg.

Application May 2, 1932, Serial No. 608,698

1 Claim. (Cl. 97—58)

My invention relates to garden tools provided with interchangeable blades.

The object of my invention is to provide a garden tool provided with a shank element adapted to have attached thereto a number of different tools, in a number of different positions, whereby various kinds of work may be done, such as hoeing or cultivating the ground, pulling weeds or forming trenches, as may be desirable.

A further object of my invention is to provide the shank element of my garden tool with blade securing means adapted to permit an earth working blade to be readily and securely attached thereto and as readily removed, so that one tool may be quickly and conveniently substituted for another.

A still further object of my invention is to provide an earth working implement which is simple of construction and economical of manufacture and so constructed as to permit the operator to maintain an upright position while doing all classes of work.

I attain my above objects in a garden tool comprising a handle, a shank mounted on the handle and a blade removably secured to the shank, the shank being curved to one side of the axis of the handle, the blade supporting face of the shank being concaved, the outer end of the shank being relatively broad, and cooperating adjustable blade-securing means provided on the blade-supporting face of the shank and the blade, whereby the blade is held firmly under tension at its extremities on the shank.

I also provide the shank of my garden tool with a detachable branching or diverging extension, also adapted to have an earth working blade attached thereto, thereby to adapt my garden tool for a greater number of uses, such as a weeder or so called "shuffle hoe".

These and other incidental features of my invention, the details of construction and mode of using the same are hereinafter fully described in the accompanying drawing.

In the drawing:

Fig. 1 shows an elevation of my garden tool partly in section and illustrates a hoe blade attached to the shank;

Fig. 2 shows a fragmentary perspective view of the end of the shank and illustrates the means for securing a blade thereto;

Fig. 3 shows a further perspective view of my garden tool and illustrates the branching extension provided with a weeder blade attached thereto;

Fig. 4 shows a section taken on the line 4—4 of Fig. 1 and further illustrates how the detachable extension is mounted on the shank and how the hoe blade is attached to the shank;

Fig. 5 shows a perspective view of the shank and the branching extension, the latter being detached from the shank;

Fig. 6 shows an enlarged section taken on the line 6—6 of Fig. 4 and further illustrates how a blade is attached to the shank;

Fig. 7 shows a fragmentary view of the end of the shank and further illustrates the blade securing means;

Fig. 8 shows a perspective view of a hoe blade; and

Figs. 9 and 10 show respectively perspective views of a weeder blade and trenching blade.

Referring now to Fig. 1: My garden tool comprises a handle $a$ provided with a curved shank $b$, having a tang $c$ by which it is secured in the end of the handle $a$.

The end of the shank $b$ is laterally widened as at $e$ to form a blade supporting surface $e'$ which is concaved, see Figs. 2 and 7, and is provided with a square hole $f$ in which is seated a square nut $g$ having shoulders $g'$, said nut adapted to have threaded into it a screw $h$. A depression $i$ is provided in the shank above the hole $f$.

A hoe blade $j$, see Figs. 4 and 8, is provided, having a keyhole slot $k$ adjacent its upper edge. The said blade is slitted as at $m$ on the upper edge to form a tongue $l$ which is bent slightly outward and provided with a stud $o$ adapted to seat in the said depression $i$ in the shank.

By these means, the hoe blade $j$ may be readily attached to the shank $b$ by inserting the head of the said screw $h$ in the keyhole slot $k$, and then moving the hoe blade along the shank so as to engage the screw head with the smaller portion of the keyhole slot, and at the same time engaging the stud $m$ in the said depression $i$. The latter holds the blade against longitudinal displacement; and due to the slight concavity $e'$ of the shank, as illustrated in Fig. 6, the hoe blade is held securely under a tension at its extremities on the shank $b$ by the head of the screw $h$.

In Fig. 6, the screw $h$ is shown partly released to permit the blade being removed. In practice the screw $h$ will be tightened so as to hold the blade securely on the shank.

Further, the sides of the slits $m$ engage with the shank $b$ and thus prevent lateral displacement of the blade; that is, its rotation about the axis of the screw $h$ is prevented.

It is to be noted that the screw $h$ and nut $g$ may be substituted by a rivet permanently secured in the shank $b$, but such construction has the disadvantage that it does not permit blades of different thicknesses being attached to the shank.

A further advantage of my construction is that if the threads of the nut $g$ or screw $h$ become rusted or mutilated, the latter may be readily replaced at small expense.

Referring now to Figs. 3 and 5: The shank $b$ is provided with a branching or diverging extension 2, the end of which is formed similarly to the portion $e$ of the shank $b$, that is, it is concaved and is laterally widened as at 3, and provided with a depression $2a$ and a screw 5 threaded in a nut 6 similar to the nut $g$, before described.

The extension 2 is detachably secured to the shank $b$ by a U-shaped member 4 welded to the shank $b$ under which the end of the extension is inserted and held by a shackle 7 welded to the extension and adapted to be clamped over the said shank $b$ by a bolt 8. The end of the extension 2 bears against the adjacent end of the handle $a$ and thus prevents the extension from being forced upwardly on the shank.

In Fig. 5 I have illustrated how a weeding blade 9, illustrated in Fig. 9, may be secured to the shank $b$ in the place of the hoe blade $j$ and in Fig. 3 I have illustrated how the weeding blade 9 may be secured to the extension 2.

Fig. 10 illustrates another form of tool 12 having a dihedral edge 13 adapted for forming trenches or the like in the ground.

It is to be noted that by providing the curved shank $b$ sufficient clearance is provided between the blade and the handle so that weeds and grass will not become entangled at the juncture of the shank and handle. Further, such curvature permits my garden tool to be used by the operator while in an upright position, as illustrated in Figs. 1, 3 and 5.

Further, the curvature of the shank $b$ forms a convenient foot rest, when a blade is secured to the extension 2 for forcing such blade into the ground as, for example, when a weeder blade is being used which is forced into the ground about the roots of the weed.

With my garden tool I avoid the need of having several different complete tools for different classes of work, thereby effecting considerable saving, especially in that only one handle is required for a variety of different tools.

I claim:

A garden tool comprising a handle, a curved shank mounted on said handle, the end of said shank being laterally widened to provide a blade supporting surface, a lug provided with a head located on said shank inwardly of said laterally widened portion, and a blade provided with a slot adapted to be engaged with said lug, said laterally widened portion of the shank being slightly curved, whereby said blade is held firmly against said lug, the portion of said blade bearing on said shank being provided with a recess engaging the latter, and being provided with a tongue having a protrusion held in a complementary depression in said shank by the curvature of said laterally widened portion of the shank.

FREDERICK C. VONDERAHE.